M. RENZ.
Weeding-Hoe.
No. 60,641.
Patented Dec. 18, 1866.
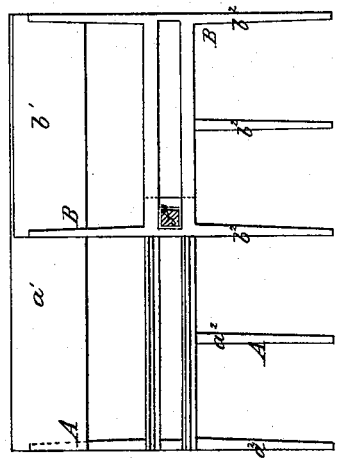
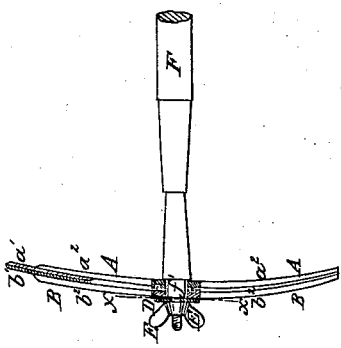
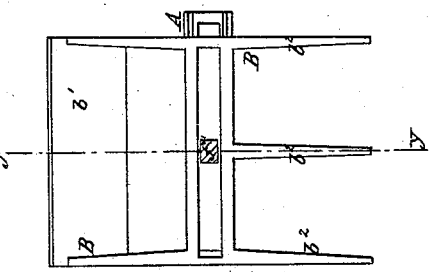
Witnesses:
Inventor:

United States Patent Office.

IMPROVEMENT IN EXTENSION WEEDING HOE.

MITCHELL RENZ, OF NAUGATUCK, CONNECTICUT.

Letters Patent No. 60,641, dated December 18, 1866.

*The Schedule referred to in these Letters Patent and making part of the same.*

TO ALL WHOM IT MAY CONCERN:

Be it known that I, MITCHELL RENZ, of Naugatuck, in the county of New Haven, and State of Connecticut, have invented a new and improved Extension Weeding Hoe; and I do hereby declare that the following is a full, clear, and exact description thereof, which will enable others skilled in the art to make and use the same, reference being had to the accompanying drawings, forming part of this specification, in which—

Figure 1 represents my improved weeding hoe when closed, partly in section through the line $x\ x$, fig. 2.

Figure 2 is a section of the same, taken through the line $y\ y$, fig. 1.

Figure 3 is the same view as figure 1, but showing the hoe opened or extended.

Similar letters of reference indicate like parts.

My invention has for its object to furnish an improved weeding hoe, so constructed that it may be contracted or expanded as desired, so that it may be adjusted for use when the plants are at different distances apart; and it consists in forming the head of the hoe in two parts, so constructed that they may overlap and slide upon each other; and in forming the said parts with ways to keep them in proper relative position upon each other while being moved back and forth, and in forming the said parts with slots for the reception of the tang of the handle, the whole being constructed and arranged as hereinafter more fully described.

A and B are the parts of the hoe head, and they consist of iron frames, to the arms on the under side of which the blades $a^1$ and $b^1$ are securely riveted. Upon the upper sides of these frames are formed rake teeth, $a^2$ and $b^2$, as shown in the drawings. The parts A and B of the head of the hoe are slotted longitudinally, as shown in the drawings, for the reception of the tang $f'$ of the handle F, so that, however much or little the said parts may be extended, the handle can always be placed in the middle of the said head. The frame of one of the said parts, as A, is extended out, or projects to lengthen the slot in that part, so that when fully extended the inner side teeth of the two parts A and B may exactly correspond with each other, as shown in fig. 3. F is the handle, the tang $f'$ of which exactly fits into the slots formed in the two parts A and B, and it is kept in place and securely attached to the said parts by the washer D and thumb-nut E, as shown in fig. 2, thus securing the handle in place, and at the same time clamping the two parts to each other, however much they may be extended. Upon the parts of the frames of the parts A and B that form the sides of the slots are formed ridges and grooves, upon which the said parts slide back and forth upon each other, and which serve as ways or guides to keep them in their proper relative positions. The ridges may both be formed in one part, and the grooves in the other, or a ridge and groove may be formed in each part, as shown in the drawings. This latter construction I prefer. The blades $a^1$ and $b^1$ of the parts A and B should be riveted to the inner sides of the arms of the frames, so that the said blades may lie close to each other, as shown in fig. 2, enabling them to act as a single blade when in use,

I claim as new, and desire to secure by Letters Patent—

1. Forming the head of the hoe in two parts, substantially as herein shown and described, so that they may overlap and slide upon each other, as and for the purpose set forth.

2. Forming ways upon the parts A and B of the hoe head to keep them in proper relative position upon each other while sliding back and forth, substantially as herein shown and described.

3. Forming slots in the parts A and B of the hoe head for the reception of the handle, substantially as herein shown and described, and for the purpose set forth.

MITCHELL RENZ.

Witnesses:
P. J. RUST,
ROBERT RENZ.